(12) United States Patent
Moon et al.

(10) Patent No.: US 9,140,212 B2
(45) Date of Patent: Sep. 22, 2015

(54) GAS TURBINE ENGINE WITH REVERSE-FLOW CORE HAVING A BYPASS FLOW SPLITTER

(75) Inventors: Francis R. Moon, Granby, CT (US); Daniel Bernard Kupratis, Wallingford, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 647 days.

(21) Appl. No.: 13/531,787

(22) Filed: Jun. 25, 2012

(65) Prior Publication Data

US 2013/0343867 A1 Dec. 26, 2013

(51) Int. Cl.
F02K 3/02 (2006.01)
F02K 3/06 (2006.01)
F02K 3/11 (2006.01)

(52) U.S. Cl.
CPC . F02K 3/025 (2013.01); F02K 3/06 (2013.01); F02K 3/11 (2013.01)

(58) Field of Classification Search
CPC ............ F01D 1/023; F01D 1/04; F01D 1/06; F01D 1/08; F01D 3/02; F02K 3/025; F02K 3/06; F02K 3/11
See application file for complete search history.

(56) References Cited

U.S. PATENT DOCUMENTS

| 2,504,181 | A | * | 4/1950 | Constant | 60/226.1 |
|---|---|---|---|---|---|
| 2,721,445 | A | * | 10/1955 | Giliberty | 60/266 |
| 3,589,132 | A | * | 6/1971 | Du Pont | 60/262 |
| 4,043,509 | A | | 8/1977 | McHugh et al. | |
| 4,285,194 | A | | 8/1981 | Nash | |
| 4,961,312 | A | | 10/1990 | Simmons | |
| 5,105,618 | A | * | 4/1992 | Lardellier | 60/226.1 |
| 5,623,823 | A | | 4/1997 | Schirle et al. | |
| 5,832,715 | A | * | 11/1998 | Dev | 60/804 |
| 7,237,378 | B2 | * | 7/2007 | Lardellier | 60/226.1 |
| 7,337,875 | B2 | | 3/2008 | Proscia et al. | |
| 7,752,835 | B2 | * | 7/2010 | Jones et al. | 60/247 |
| 8,082,727 | B2 | | 12/2011 | Roberge | |
| 8,096,753 | B2 | | 1/2012 | Norris et al. | |
| 8,127,528 | B2 | | 3/2012 | Roberge | |
| 2009/0255269 | A1 | | 10/2009 | Petty et al. | |
| 2010/0037623 | A1 | * | 2/2010 | Jewess et al. | 60/770 |
| 2011/0056208 | A1 | | 3/2011 | Norris et al. | |
| 2013/0025286 | A1 | * | 1/2013 | Kupratis | 60/772 |
| 2013/0145769 | A1 | * | 6/2013 | Norris et al. | 60/772 |

FOREIGN PATENT DOCUMENTS

EP  1 533 510  8/2011

* cited by examiner

Primary Examiner — Igor Kershteyn

(74) Attorney, Agent, or Firm — Carlson, Gaskey & Olds, P.C.

(57) ABSTRACT

A gas turbine engine includes a bypass flow path. A core flow path has a reverse duct configured to reverse a direction of core flow. The core flow path includes an exhaust duct in fluid communication with the bypass flow path and is configured to introduce core exhaust flow in the core flow path back into the bypass flow path. A splitter is arranged in the bypass flow path and adjoins the exhaust duct.

17 Claims, 3 Drawing Sheets

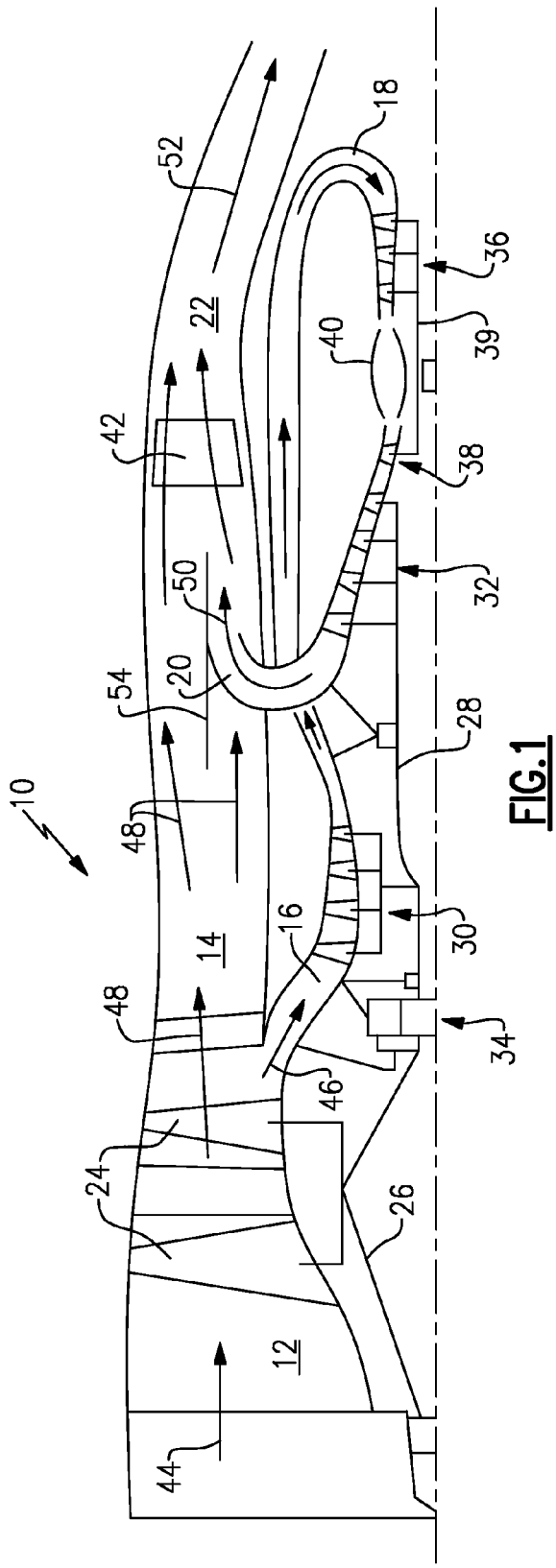
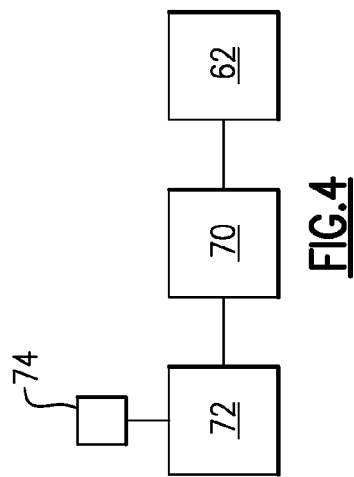

GAS TURBINE ENGINE WITH REVERSE-FLOW CORE HAVING A BYPASS FLOW SPLITTER

STATEMENT REGARDING FEDERALLY SPONSORED RESEARCH OR DEVELOPMENT

This invention was made with government support under Contract No. FA8650-09-D-2923 awarded by the United States Air Force. The Government has certain rights in this invention.

BACKGROUND

This disclosure relates to a gas turbine engine having a reverse-flow core. More particularly, the disclosure relates to the introduction of a core exhaust flow back into a bypass flow.

One type of engine includes an inlet flow path that is divided into a bypass flow path and a core flow path. The flow along the core flow path is reversed, or doubled back upon itself, by a reverse duct. This arrangement is referred to as a "reverse-flow core." Such an arrangement enables the low pressure compressor and turbine to be mounted next to one another, and the high pressure compressor and turbine to be mounted next to one another.

The flow from the core flow path is reintroduced into the bypass flow path by an exhaust duct and is then expelled out an exhaust flow path provided in the bypass flow path. The hot core exhaust flow must mix with the much cooler bypass flow.

SUMMARY

In one exemplary embodiment, a gas turbine engine includes a bypass flow path. A core flow path has a reverse duct that is configured to reverse a direction of core flow. The core flow path includes an exhaust duct in fluid communication with the bypass flow path and is configured to introduce core exhaust flow in the core flow path back into the bypass flow path. A splitter is arranged in the bypass flow path and adjoining the exhaust duct.

In a further embodiment of any of the above, the gas turbine engine includes a low pressure compressor and a low pressure turbine mounted on a low spool near one another, and a high pressure turbine and a high pressure compressor mounted on a high spool near one another. The low and high pressure turbines arranged axially between the low and high pressure compressors.

In a further embodiment of any of the above, the reverse duct and the exhaust duct direct the core flow in a radial direction.

In a further embodiment of any of the above, the splitter is a linearly extending annular structure.

In a further embodiment of any of the above, the splitter and exhaust duct provide a unitary structure.

In a further embodiment of any of the above, the gas turbine engine includes an array of circumferentially spaced, discrete exhaust ducts adjoining the splitter.

In a further embodiment of any of the above, the splitter is hollow and includes first and second sides providing a cavity.

In a further embodiment of any of the above, the splitter includes an inlet configured to communicate bypass flow to the cavity.

In a further embodiment of any of the above, the splitter includes a door arranged in the cavity to selectively block the inlet.

In a further embodiment of any of the above, the door is configured to move linearly between open and closed positions.

In a further embodiment of any of the above, the splitter includes film cooling holes circumferentially aligned with and arranged downstream from the exhaust duct. The door is configured to regulate a cooling flow through the cavity and out the film cooling holes.

In a further embodiment of any of the above, the inlet is arranged on an inner side of the splitter.

In a further embodiment of any of the above, the inlet is arranged on an outer side of the splitter.

In a further embodiment of any of the above, the gas turbine engine includes a controller in communication with an actuator that is operatively connected to the door. The controller is configured to provide a command to the actuator to regulate the position of the door based upon a needed amount of cooling flow.

In a further embodiment of any of the above, the gas turbine engine includes a fan speed sensor in communication with the actuator, the need amount of cooling flow related to a fan speed.

In another exemplary embodiment, a method of controlling fluid flow in a reverse-core gas turbine engine, the method includes the steps of splitting a bypass flow with a splitter, and introducing a core exhaust flow to the bypass flow at the splitter.

In a further embodiment of any of the above, the method includes the step of cooling the splitter.

In a further embodiment of any of the above, the splitter cooling step includes creating a cooling film on the splitter with a portion of the bypass flow.

In a further embodiment of any of the above, the splitter cooling step includes regulating a position of a door within the splitter to selectively block a cooling flow within the splitter.

BRIEF DESCRIPTION OF THE DRAWINGS

The disclosure can be further understood by reference to the following detailed description when considered in connection with the accompanying drawings wherein:

FIG. 1 is a schematic view of a reverse-flow core of a gas turbine engine.

FIG. 4 is a schematic of a control system for the bypass flow path splitter.

DETAILED DESCRIPTION

Figure 2:
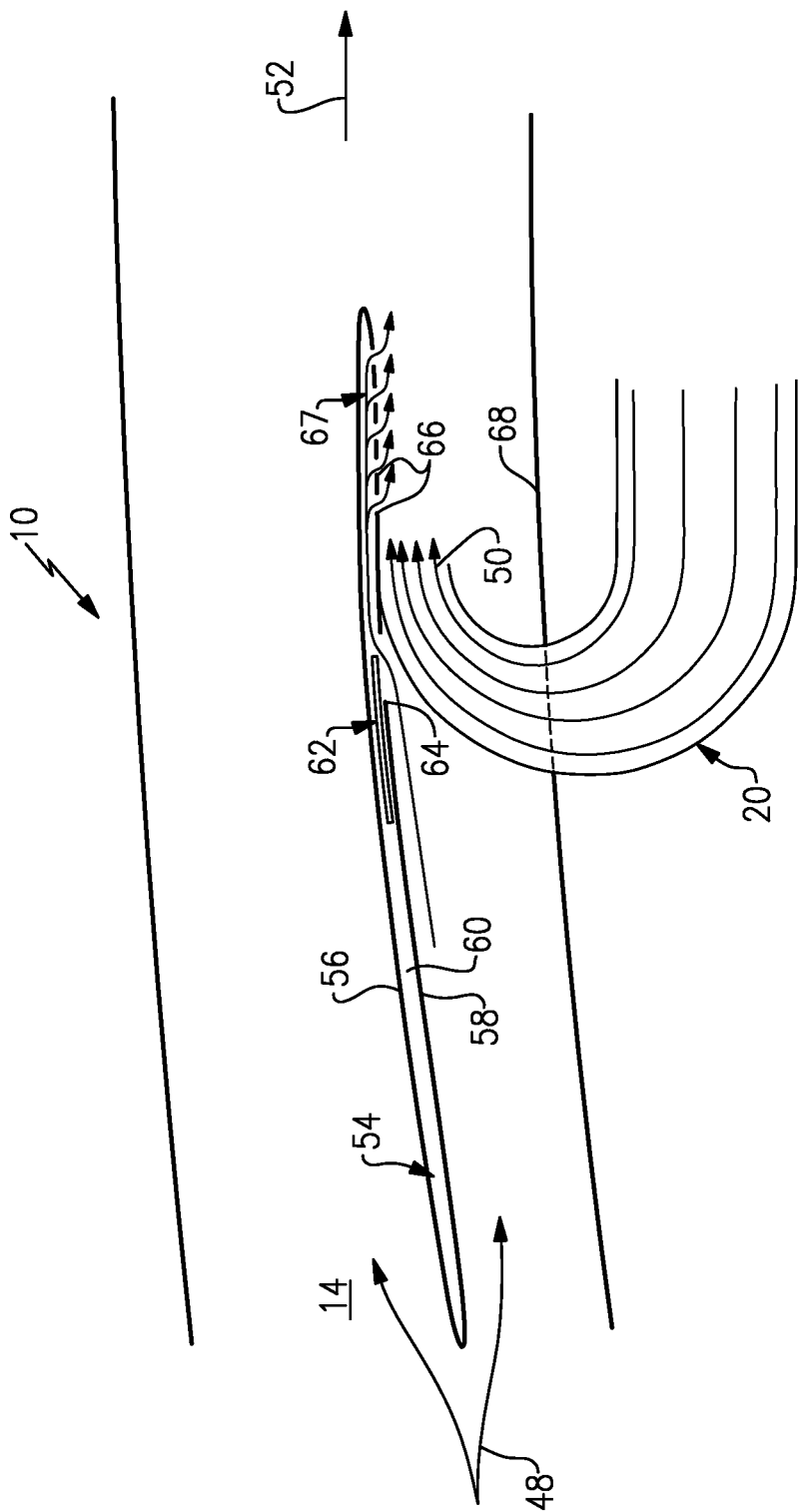
FIG. 2 is an example bypass flow path splitter with a core exhaust flow cooling feature.

An example reverse-flow core gas turbine engine 10 is illustrated in FIG. 1. In general, the engine 10 includes an inlet flow path 12 that is divided into a bypass flow path 14 and a core flow path 16. The flow along the core flow path 16 is reversed, or doubled back upon itself, by a reverse duct 18. The flow from the core flow path 16 is reintroduced into the bypass flow path 14 by an exhaust duct 20 and is then expelled out an exhaust flow path 22 provided in the bypass flow path 14. The reverse duct 18 and the exhaust duct 20 direct a core flow within the core flow path 16 in a radial direction.

In the example, a fan 24 is mounted on a fan spool 26 and arranged in the inlet flow path 12. A low pressure compressor 30 and a low pressure turbine 32 are arranged near one another and are mounted on a common low spool 28. A gear train 34 may be coupled between the fan spool 26 and the low spool 28 to provide a speed reduction that enables the fan spool 26 to be driven at a lower speed than the low spool 28.

A high pressure compressor 36 and a high pressure turbine 38 are arranged near one another and are mounted on a common high spool 39. A combustor 40 is arranged axially between the high pressure compressor 36 and the high pressure turbine 38. The fan, low and high spools 26, 28, 39 are rotatable about a common axis, indicated by the dashed line in FIG. 1. The low and high pressure turbines 32, 38 are arranged axially between the low and high pressure compressors 30, 36.

In operation, the fan 24 propels an inlet flow 44 through the inlet flow path 12. A portion of the flow enters the core flow path 16 to provide a core flow 46 that is received and compressed by the low pressure compressor 28. The low pressure core flow is provided to the reverse duct 18 after which the flow is provided to the high pressure compressor 36. Fuel is introduced to the high pressure flow by the combustor 40. The combusted air-fuel mixture, or core exhaust flow 50, is expelled through the high pressure turbine 38, which drives the high pressure compressor 36. The core exhaust flow 50 further expands in the low pressure turbine 32, driving the low pressure compressor 30 and the fan 24 via the gear train 34.

The core exhaust flow 50 is introduced to a bypass flow 48 in the bypass flow path 14 and combine to provide a bypass exhaust flow 52 that provides the engine's thrust. A splitter 54 is arranged in the bypass flow path 14 and adjoins the exhaust duct 20. The splitter 54 splits the bypass flow 48 and controls the mixing of the core exhaust flow 50 into the bypass flow 48 to increase aerodynamic efficiency and reduce the diameter of the engine 10. The thrust may be further increased by an augmenter arranged in the bypass flow path 14 downstream from the splitter 54.

The splitter 54 is exposed to the very hot gases of the core exhaust flow 50, making cooling of the splitter desirable. In the example, the splitter 54, which is an annular airfoil, provides a unitary structure with the exhaust duct 20. Referring to FIG. 2, the exhaust duct 20 is provided by a circumferential array of individual ducts (one shown) that each penetrate an inner flow surface 68 of the bypass flow path 14.

The splitter 54 is provided by first and second sides 56, 58 that are spaced apart from one another to provide a hollow cavity 60. Doors 62 are arranged in the cavity 60. Each door 62 is linearly movable between open and closed positions to selectively block an inlet 64. In the example shown in FIG. 2, the inlet 64 is provided in the second side, which is arranged interiorly of the first side 56. With the inlet 64 at least partially unblocked, bypass flow 48 in the bypass flow path 14 is permitted to enter the cavity 60 to provide a cooling flow 67. The cooling flow 67 exits through film cooling holes 66 in the second side 56 circumferentially aligned with and downstream from the exhaust ducts 20. The cooling flow 67 provides a cooling film that provides a protective layer of fluid along the second side 58 that insulates the splitter 54 from the core exhaust flow 50. The first side 154 is cooled by the passing bypass flow 48.

Figure 3:
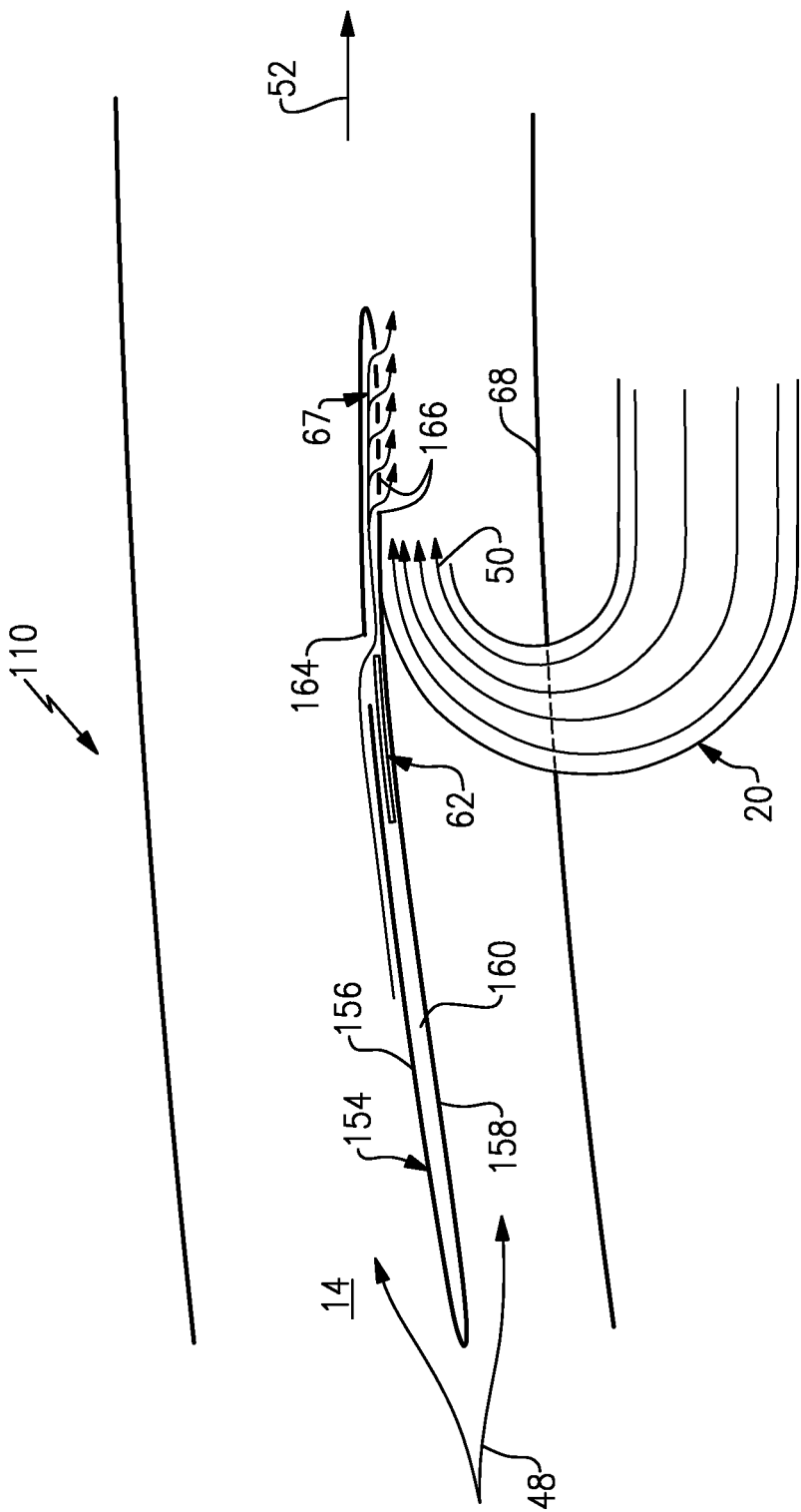
FIG. 3 is another example bypass flow path splitter with a core exhaust flow cooling feature.

A similar arrangement is shown in FIG. 3 for an engine 110. The splitter 154 provides the inlet 164 on the first side 156, rather than the second side 158. The doors 62, which may be slidable within the cavity 160, regulate the flow of bypass flow 48 into the cavity 160 and out the film cooling holes 166.

An example schematic of a control system is shown in FIG. 4. A controller 72 is in communication with an actuator 70 operatively coupled to the doors 62. The position of the doors 62 is regulated by the controller 72 providing a command to the actuator 70. A sensor 74, such as a fan speed sensor, communicates with the controller 72, which may determine the needed amount of cooling flow based upon the fan speed, for example.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
    a bypass flow path;
    a core flow path having a reverse duct configured to reverse a direction of core flow, the core flow path including an exhaust duct in fluid communication with the bypass flow path and configured to introduce core exhaust flow in the core flow path back into the bypass flow path; and
    a splitter arranged in the bypass flow path and adjoining the exhaust duct, wherein the splitter is a linearly extending annular structure that circumscribe an axis of the gas turbine engine, a leading edge of the splitter is arranged axially forward of the exhaust duct.

2. The gas turbine engine according to claim 1, comprising a low pressure compressor and a low pressure turbine mounted on a low spool near one another, and a high pressure turbine and a high pressure compressor mounted on a high spool near one another, the low and high pressure turbines arranged axially between the low and high pressure compressors.

3. The gas turbine engine according to claim 1, wherein the reverse duct and the exhaust duct direct the core flow in a radial direction.

4. The gas turbine engine according to claim 1, wherein the splitter and exhaust duct provide a unitary structure.

5. The gas turbine engine according to claim 4, comprising an array of circumferentially spaced, discrete exhaust ducts adjoining the splitter.

6. A gas turbine engine comprising:
    a bypass flow path;
    a core flow path having a reverse duct configured to reverse a direction of core flow, the core flow path including an exhaust duct in fluid communication with the bypass flow path and configured to introduce core exhaust flow in the core flow path back into the bypass flow path; and
    a splitter arranged in the bypass flow path and adjoining the exhaust duct, wherein the splitter is hollow and includes first and second sides providing a cavity.

7. The gas turbine engine according to claim 6, wherein the splitter includes an inlet configured to communicate bypass flow to the cavity.

8. The gas turbine engine according to claim 7, wherein the splitter includes a door arranged in the cavity to selectively block the inlet.

9. The gas turbine engine according to claim 8, wherein the door is configured to move linearly between open and closed positions.

10. The gas turbine engine according to claim 9, wherein the splitter includes film cooling holes circumferentially aligned with and arranged downstream from the exhaust duct, the door configured to regulate a cooling flow through the cavity and out the film cooling holes.

11. The gas turbine engine according to claim 7, wherein the inlet is arranged on an inner side of the splitter.

12. The gas turbine engine according to claim 7, wherein the inlet is arranged on an outer side of the splitter.

13. The gas turbine engine according to claim 10, comprising a controller in communication with an actuator that is operatively connected to the door, the controller configured to provide a command to the actuator to regulate the position of the door based upon a needed amount of cooling flow.

14. The gas turbine engine according to claim 13, comprising a fan speed sensor in communication with the actuator, the need amount of cooling flow related to a fan speed.

15. A method of controlling fluid flow in a reverse-core gas turbine engine, the method comprising the steps of:
   splitting a bypass flow with a splitter;
   introducing a core exhaust flow to the bypass flow at the splitter; and
   cooling the splitter.

16. The method according to claim 15, wherein the splitter cooling step includes creating a cooling film on the splitter with a portion of the bypass flow.

17. The method according to claim 16, wherein the splitter cooling step includes regulating a position of a door within the splitter to selectively block a cooling flow within the splitter.

* * * * *